United States Patent Office 2,796,511
Patented June 18, 1957

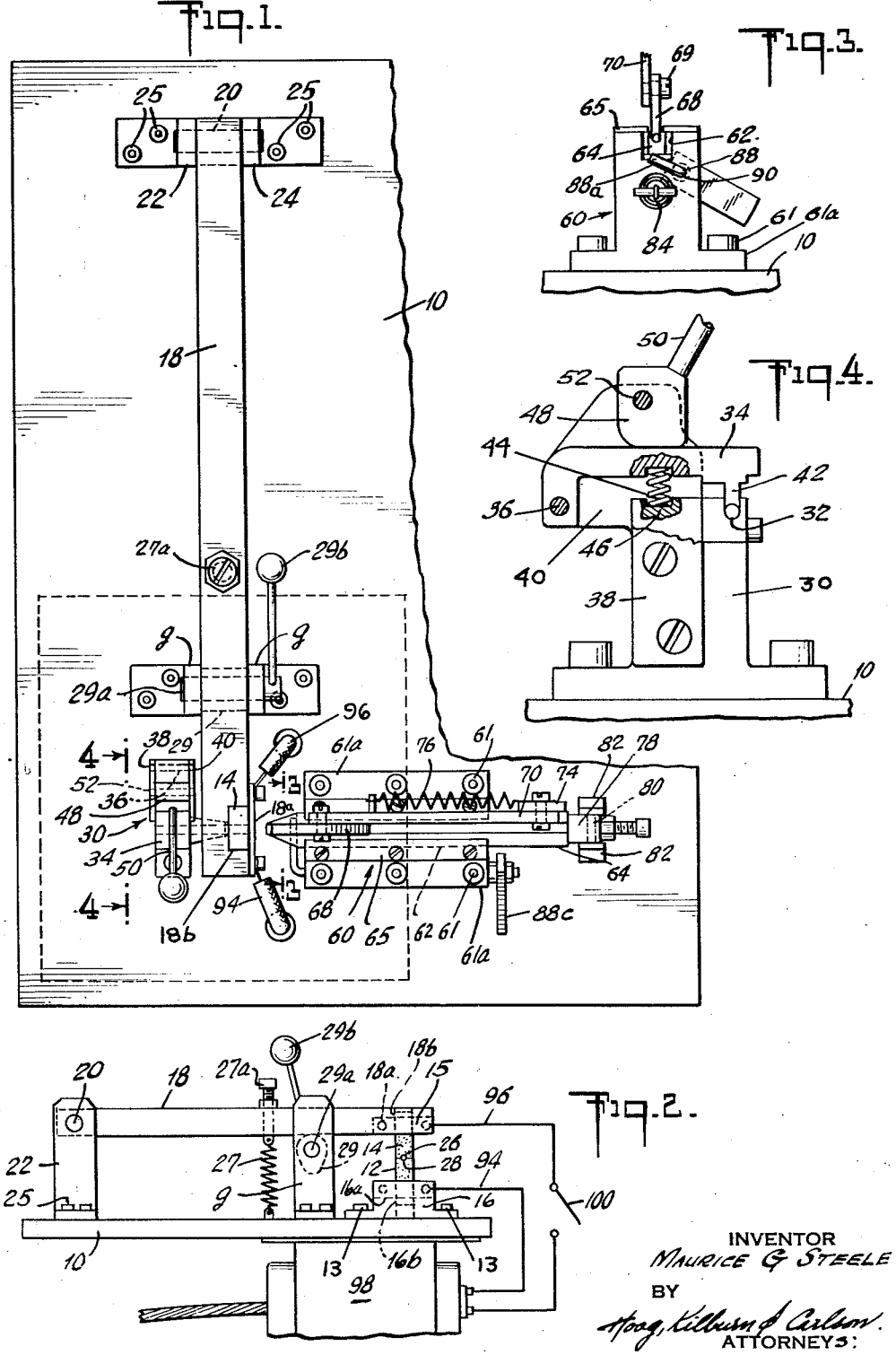

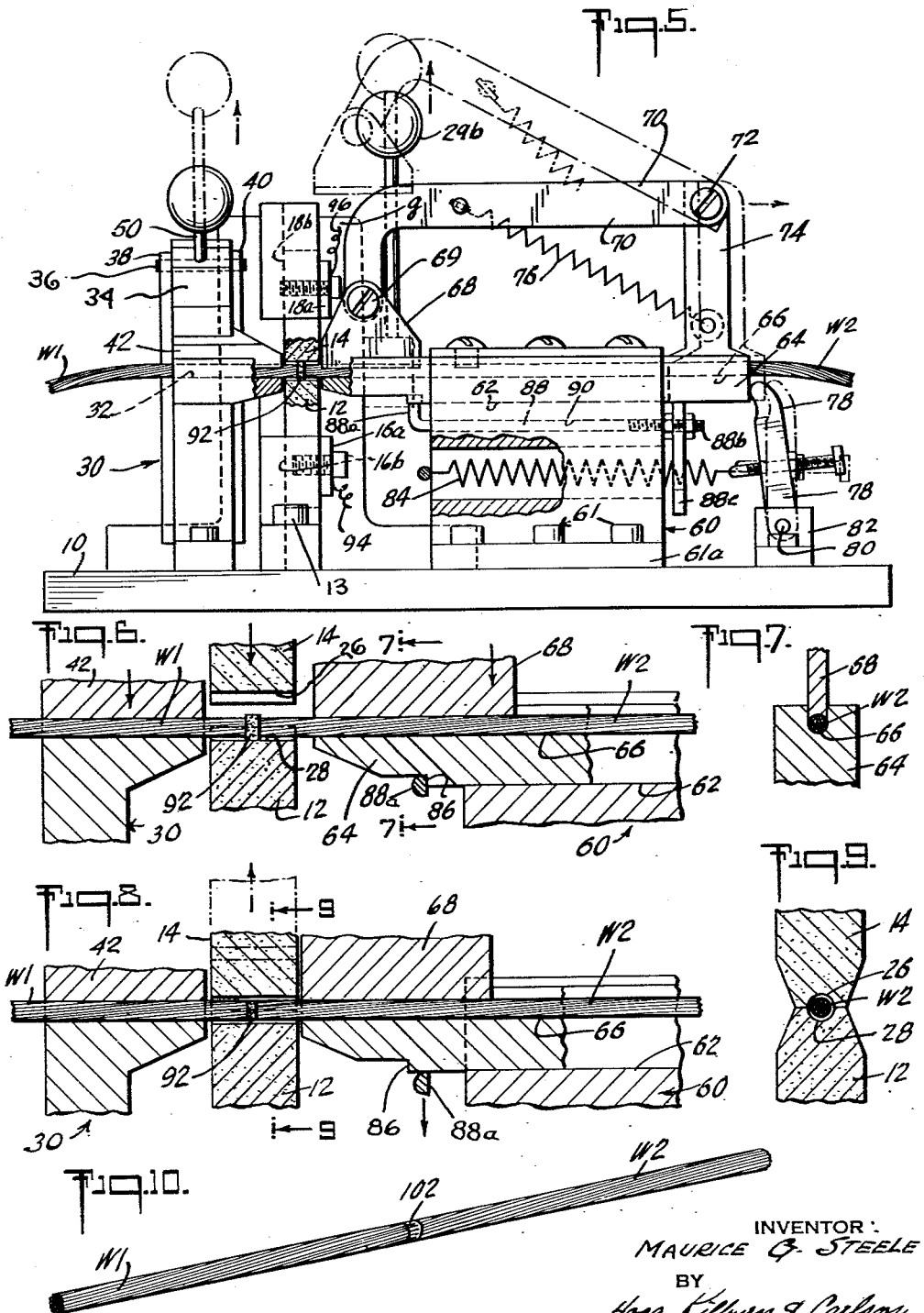

2,796,511

METHOD AND APPARATUS FOR JOINING WIRES BY BRAZING

Maurice G. Steele, Rome, N. Y., assignor to Rome Cable Corporation, Rome, N. Y., a corporation of New York Application March 22, 1954, Serial No. 417,733

5 Claims. (Cl. 219—85)

This invention relates to brazing apparatus for joining wires and particularly for joining wires in abutting end to end relation, especially stranded wires.

Electric brazing of wires and conductors has not been used extensively heretofore, as the available equipment has been too complex, too inconvenient and too expensive. Such brazing of wires and conductors as has been done, has been performed of necessity at the brazing machine, which was not portable, rather than at the location of the wire ends. Convenient and controlled means for such brazing at the work location have not been available.

In brazing, small amounts of a metal compound are introduced between the aligned opposed ends of wires, and are heated, fused and then cooled to adhere to each wire end and thus join them. The operation is distinct from welding which employs higher temperatures to melt the opposed surfaces of objects to be joined. Welding causes the metal of two objects to flow together when heated under pressure and to cohere when cooled. In brazing the opposed objects are not directly joined. Instead each is joined to the brazing compound which is interposed between them and, since the compound is usually of material different from the wires, the union is adhesion rather than cohesion. Many electric conductors are made up of a number of wires called strands, for example, #12 stranded copper conductor comprises 164 strands of #34 wire, and at the high temperatures characteristic of welding (for copper conductor about 1800–2100° F.) some of the strand ends are likely to be melted or otherwise impaired. Brazing temperatures for joining the ends of a wire conductor for example are on the order of 1200–1450° F.

In the ensuing specification the word "wire" will be used in its general sense to denote either a solid wire or a stranded conductor.

When brazing has been employed heretofore for joining wire ends the usual method has been to drop the wire ends in borax paste and then in powdered silver solder. The wire ends were then positioned manually and heat, usually from a gas flame, was applied. In some cases too much heat was allied and the metal was practically fused. Due to the gas the brazing metal had a tendency to oxidize and with little or no pressure existing between the wire ends some oxide was left in the braze metal which weakened the joint. Furthermore, there was no real positioned of the wire ends which is very difficult when the wires are held manually and an eccentric, offset joint often resulted. The wire ends were pushed into contact with an amount of brazing metal compound introduced in a variety of ways between or adjacent to the two wire ends. Regardless of whether the amount of heat necessary to melt the brazing compound is provided by a gas flame, by electric resistance heating, or by other heating means this method of brazing does not provide uniform positioning or uniform heating of the wire ends and is dependent largely upon the skill of the operator.

In prior art when electric resistance heating has been employed the brazing compound has been usually in the form of a single cylindrical pellet having approximately the same diameter as that of the wires to be joined. Both the pellet and the two wire ends were introduced between two opposed heating electrodes. This procedure is unsatisfactory for several reasons. The wires, being good heat conductors, are readily heated and are annealed for an undesirable distance on either side of the brazing joint, thus impairing the quality of the product. Moreover, if the lengths to be joined are stranded wire further difficulties result from this procedure, for the brazing compound penetrates the strands and flows axially away from the joint. Upon cooling the wire is stiffened, due to the brazing metal for a substantial distance on either side of the joint, which is undesirable. Furthermore, much of the brazing metal leaves the vicinity of the juncture of the two wires where it is needed to effect a satisfactory joint. When urged into contact by hand the ends of the stranded wire tend to bend or "balloon out" because of their relative weakness and resulting column action. This makes it difficult to hold the wire ends in suitable axial alignment and usually produces an unsatisfactory connection.

Accordingly it is an object of this invention to provide improved method and apparatus for joining wire ends by brazing.

Another object of the invention is to provide a compact controllable and portable brazer for wires and conductors which is also economical and convenient to use.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a plan view of apparatus embodying the invention;

Figure 2 is a side view on a smaller scale than Figure 1;

Figure 3 is an end view looking toward the right taken on line 3—3 of Figure 1;

Figure 4 is a detail view taken on the line 4—4 of Fig. 1;

Figure 5 is a front elevational view;

Figure 6 is an enlarged detail view showing the relation of the wire ends to the electrodes, to the pellet of brazing material, and to each other, prior to lowering upper electrode 14 into contact with the lower electrode and prior to the start of the brazing operation;

Figure 7 is a vertical section taken on the line 7—7 of Figure 6;

Figure 8 is a view similar to Figure 6 but showing the relation of the wire ends to the electrodes, to the pellet of brazing material, and to each other, after the pellet has been softened and wire $w^2$ advanced further toward wire $w^1$;

Figure 9 is a vertical sectional detail view taken on the line 9—9 of Figure 8; and Figure 10 is a perspective view showing the wires $w^1$ and $w^2$ interconnected and joined together after the brazing operation.

In the embodiment of the invention shown in the drawings a pair of electrodes 12 and 14, preferably of carbon, are mounted in directly opposed relation, electrode 12 being removably retained by member 16a in a slot 16b in the upright 16 fixed on the insulating base 10 by screws 13, and electrode 14 being removably retained by member 18a in a slot 18b adjacent the front end of lever 18, the other end of which is pivotally supported on pivot 20 mounted between the uprights 22 and 24, the flanged lower ends of which are secured to insulating base 10 by the screws 25. The opposed surfaces of said electrodes are each grooved with the grooves 26 and 28 respectively which, as shown, but not necessarily, are substantially semi-circular, and disposed in register when the electrodes are closed against each other, to provide a space which is of slightly greater diameter than the diameter of the wire ends to be joined. The heating current is supplied directly to the electrodes. This size relationship causes a relatively small flow of electricity through the wire ends since the path of least resistance is directly from one electrode to the other. It also provides space within which one wire end may be moved longitudinally toward the other which is desirable, as will be explained. To insure good contact between the electrodes 12 and 14 and indexing of the grooves 26 and 28 for accurate register one with the other, two upright guide members g are provided projecting up from the base 10 to embrace lever 18 on either side and to guide it in its up and down motion. A tension spring 27 suitably attached to base 10 is adjustably attached to lever 18 by adjusting screw 27a to positively urge electrode 14 into contact with electrode 12. By adjusting means 27a the spring 27 may be adjusted for optimum pressure. By a lift cam 29 pivotally mounted on the pivot pin 29a extending between said guides and actuated by handle 29b the lever 18 is raised and lowered against the tension of said spring.

On either side of the electrodes I provide means for supporting, holding and compressing the wire ends during the brazing operation. On one side of the electrodes I provide the support member 30 mounted on said base 10 and having the groove or trough 32 in its upper surface, the inner portion or bottom of said groove being substantially axially aligned with the space defined by the registering grooves 26 and 28 in the opposed electrodes. Support 30 comprises the lower member of a two-part wire clamping means.

The upper clamp member comprises the arm 34 pivotally mounted on pivot 36, extending between the uprights 38 and 40 which are on opposite sides of support member 30. Projecting from arm 34 adjacent its front end is a punch-like male member 42 which is aligned with groove 32 and has a thickness permitting it to be swung down into the groove 32 to engage and hold a wire end which has been inserted in said groove. The lower end of punch-like member 42 is concave and preferably complementary to the curvature at the bottom of groove 32 for fitting over a wire in groove 32 and forming a snug closure around the wire. A wire end $w^1$ held in groove 32 by member 34 is compressed radially while being positioned and held in alignment with the heating space defined by the complementary grooves 26 and 28 in the electrodes when the electrodes are closed and therefore in abutting contact. It will be noted that the grooved support member 30 and the punch-like male member 42 are tapered and extended toward the electrodes so that there is a very small clearance between them and the electrodes, (see Figure 5). This provides almost continuous support for the wire and prevents bending or "ballooning" of the wire.

A spring 44 is provided, extending between the underside of arm 34 and a member 46. Spring 44 acts to elevate arm 34, and a cam member 48, pivoted on pivot 52 between said uprights 38 and 40 above said arm and controlled by lever 50, is provided to depress arm 34 into clamping position, and hold member 42 down in groove 32, and to transmit to said punch member 42 force to compress a wire end in groove 32 and to coact with said groove in securely holding the wire end against movement vertically or axially of the groove.

On the side of the electrodes opposite supports 30 the support member 60 is secured on base 10, as by screws 61 extending through the flanges 61a of member 60. In the upper surface of support member 60 is a slot 62 forming a slideway in which a sliding member 64 is mounted for movement toward and away from the electrodes 12 and 14 and support 30, and substantially in the plane of the interface between said electrodes when they are in closed, contacting position. The slot 62 may be formed with overhanging edges to retain sliding member 64 from displacement vertically, or, as shown, plates 65 may be secured on support member 60 on either side of slot 62 and projecting part way over said slot to provide a suitable slideway.

In its upper surface member 64 has the groove or trough 66 the inner end or bottom of which is substantially aligned both horizontally and vertically with the space defined by the registering grooves 26 and 28 in the opposed electrodes, and also with the groove 32 in support 30.

Support member 60 and more specifically sliding member 64 comprises the lower member of a two-part sliding wire clamping means. The groove 66 in member 64 coacts with an upper clamp member comprising a punch-like or male member 68 projecting down from the front end of arm 70 which is pivoted by pivot 72 on the upright support member 74 the lower end of which is fixed on one side of member 64 adjacent its rear end. Member 68 is preferably pivoted to the pivoted arm 70, as by pivot 69, for exerting even pressure along the length of a wire $w^2$ engaged and held between it and the bottom of member 66. The under surface of member 66 is concave and preferably complementary to the curvature at the bottom of groove 66 for fitting over a wire in groove 66 and forming a closure around the wire, within which the wire end is compressed radially while being positioned and held in alignment with the heating space defined by the complementary grooves 26 and 28 in the electrodes when the electrodes are closed and therefore in abutting contact. Tension spring 76 attached as shown between arm 70 and the upright support 74 provides pressure to pull member 68 down into grooves 66, and to transmit to said member 68 force to compress a wire end in groove 66, and to coact with said groove in securely holding the wire end against movement vertically or axially of the groove.

A presser arm 78 which is pivoted by pivot 80 between the arms of bracket 82, secured on base 10 at the far end of support member 60 from the electrodes, is actuated by a spring 84 extending between it and support member 60 to urge the member 64 to move in its slideway 62 toward the electrodes 12 and 14 and the support 30. It is thus able to advance a wire end $w^2$, supported in groove 66 in member 64, toward a wire end $w^1$ supported in support 30. A shoulder 86 is provided on the under side of member 64 and a latch is provided to engage against said shoulder and restrain member 64 from movement toward the electrodes. As illustrated herein the latch comprises a rod 88 rotatable in the bore 90 extending longitudinally through support member 60, the forward end 88a of said rod being bent at right angles for movement into the path of said shoulder 86 on member 64, and on the other end, 88b, of said rod, projecting at right angles to the main portion of rod 88, a handle 88c is provided, by means of which the rod may be readily rotated in one direction to move the forward end 88a to lock member 64, and rotated in the opposite direction to unlock the slide to permit it to move toward the electrodes and advance the wire end carried by said member, which is desirably done once during each operation of joining a pair of wire ends by brazing. It will be noted that forward end 88a has been flattened to properly engage shoulder 86. Rod 88 is threaded at end 88b and is adjustable for length by means of the lock nuts shown on either side of the handle.

In the operation of my device to perform a brazing operation according to my method, a pair of wire ends $w^1$ and $w^2$ are placed in the grooves 32 and 66 in support member 30 and member 64 respectively, the opposed extremities of said wires preferably having been cut off squarely and cleanly. The wire $w^1$ in groove 32 is positioned with the end which is to be welded extending into the groove 28 in electrode 12, but not quite to the midpoint axially of the groove, and is clamped in this position by lowering arm 34 carrying clamp member 42. A pellet 92 of brazing metal, of any suitable kind, such for example as a silver brazing alloy which is commercially available under the trade name of "Sil-Fos" is next positioned in groove 28 adjacent to the end of wire $w^1$. This pellet should preferably be cylindrical in shape and of diameter equal to or very slightly larger than the diameter of composite groove 26, 28 in the electrodes. With member 64 held by latch 88 in optimum position the wire end $w^2$ in groove 66 is next positioned and clamped by means of member 68 with its extremity extending into groove 28 in electrode 12 and abutting pellet 92 (see Figure 6) which in turn abuts end of wire $w^1$. Handle 29b is next operated to permit the tension spring 27 to depress arm 18 and lower electrode 14 into firm contact with electrode 12, bringing groove 26 into accurate registry with groove 28, and forming a closure which substantially surrounds the brazing pellet and the aligned ends of the wires $w^1$ and $w^2$ which are to be joined. Latch rod 88 is next rotated to release latch 88a from engagement with shoulder 86 of member 64, whereupon wire end $w^2$ is forced, by action of presser arm 78 against member 64, against pellet 92 which in turn presses against the wire end $w^1$. It should be noted that latch 88a should be adjusted so that the end of sliding member 64 is a definite, predetermined distance away from the nearest edge of the electrodes (see Figure 6). This distance should be such that when the braze is complete there is very small clearance between the ends of member 64 and member 68 and the edge of the electrodes. (see Figure 8) This final clearance should be about equal to the clearance between the electrodes and members 30 and 42 on the other side. This close support of the wire prevents bending or "ballooning" of the wire and provides a chilling effect as close as possible to the brazed joint.

Next an electric circuit is closed through said electrodes 12 and 14, which are connected with the leads 94 and 96 respectively, leading, as shown in Figure 2, from a transformer 98, said circuit including a control switch such as switch 100 shown in Figure 2.

The heat generated within the space defined between the electrodes by grooves 26 and 28 will cause the brazing material to fuse and the wire ends to heat. As the brazing pellet fuses, wire $w^2$ is forced into the molten brazing metal by the spring action of member 64, compacting the softened brazing metal against the end of wire $w^1$ supported by support 30 and the walls of the electrode grooves. Member 64 will move forward so that its distance from the electrodes is about the same as the distance of support 30 and member 42 from the opposite side of the electrodes (see Figure 8). When this action is complete the electric circuit is opened but the electrodes and wire clamps are maintained in closed position holding and enclosing the wire ends which are now joined while the brazing material hardens and the portion of the jointed wire between the wire clamps is cooling. Handle 29b is next operated to raise arm 18 and thus separate the electrodes, and last, the clamp means 34—42 and 70—68 are elevated freeing the opposed wires which are now joined by the joint 102, as illustrated in Figure 10, interconnecting the wires $w^1$ and $w^2$.

The supports, 30, and 60 including member 64, and the coacting clamp members 34—42 and 66—68, serve not only to position the wires $w^1$ and $w^2$ to be joined, and to advance one wire toward the other to press the fused brazing material between them during the brazing operation, but I have found they perform the valuable additional function of acting as chills, preventing the portions of the wires with which they are in direct contact from being heated by conduction to an extent such that they become annealed.

Furthermore the grooves 32 and 66, and the respective coacting clamp members 42 and 68, by compressing and chilling the wires very close to their extremities which abut against the pellet 92 of brazing material, prevent flow of the brazing material longitudinally between wire strands when the wires to be joined are stranded wires. This is a very important result for such flow is very objectionable since brazing material penetrating between the strands of such wires further stiffens them, and the greater the distance of stiffening the more the usefulness of the wire is impaired. Moreover, the brazing metal is retained near the juncture of wires $w^1$ and $w^2$ where it is needed to effect a sound joint. By my device a brazed joint may be accomplished according to my method in which the stiffened area is substantially limited to a length equal to the distance between the adjacent ends of the support and members 30—42 and 64—68 when the members 64—68 are in their final position.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. Brazing apparatus comprising a plurality of clamping means for encircling a plurality of wires close to their ends respectively for holding and chilling said wires, said clamping means being disposed close together but spaced apart sufficiently to admit a plurality of electrodes between them, a plurality of electrodes each having a semi-circular depression in its extremity, means for bringing said electrodes into opposition and for passing a current through them, said depressions being of a size to provide a space of slightly greater diameter than the diameter of said wires, adapted to receive a pellet of brazing material inserted between the wire ends and to compact the material when the pellet is fused by heat within said space, and means for moving one of said clamping means toward the other to compact the fused brazing material between the ends of said wires and within the space provided between said opposed electrodes.

2. The apparatus claimed in claim 1, including means for automatically controlling the extent of force with which the movable wire end is pressed against the fused brazing material.

3. Brazing apparatus comprising a pair of clamping means for clamping a pair of wires close to their ends respectively for holding said wires, said clamping means being disposed close together but spaced apart sufficiently to admit a pair of electrodes between them, a pair of electrodes each having a depression in its extremity, means for bringing said electrodes into contact with each other to form a heating space for the ends of said wires and aadpted to receive brazing material between said ends of said wires, means for passing current through the contacting ends of said electrodes to heat said brazing material and said ends of said wires in said heating space, and means for moving one of said clamping means a predetermined distance toward the other to braze said wires together.

4. The method of joining two wires in end to end relation by brazing which comprises clamping said wires end to end and then, while chilling said wires, heating the ends of said wires in a substantially enclosed space with a pellet of brazing material between the ends of said wires, and simultaneously moving at least one of said wires a predetermined distance toward the other to braze said wires together.

5. The method of joining two wires in end to end relation by brazing which comprises clamping said wires end to end and then heating the ends of said wires in a substantially enclosed space with a pellet of brazing material between the ends of said wires, and simultaneously moving at least one of said wires a predetermined distance toward the other to braze said wires together.

References Cited in the file of this patent
UNITED STATES PATENTS

| | | |
|---|---|---|
| 386,441 | Thomson | July 17, 1888 |
| 434,450 | Lemp | Aug. 19, 1890 |
| 1,736,428 | Bryant | Nov. 19, 1929 |
| 2,018,379 | Pfeiffer | Oct. 22, 1935 |
| 2,459,863 | Berggren | Jan. 25, 1949 |
| 2,677,746 | Duch et al. | May 4, 1954 |